March 18, 1958     E. J. SMITH ET AL     2,827,575

ALL-MAGNETIC MODULATOR TYPE PULSE GENERATOR

Filed Dec. 5, 1956

INVENTORS
EDWARD J. SMITH
BY JOSEPH ANTIN

Ralph B. Stewart
attorney

United States Patent Office 2,827,575
Patented Mar. 18, 1958

2,827,575

ALL-MAGNETIC MODULATOR TYPE PULSE GENERATOR

Edward J. Smith, Brooklyn, and Joseph Antin, Laurelton, N. Y., assignors to Polytechnic Institute of Brooklyn, Brooklyn, N. Y., a corporation of New York Application December 5, 1956, Serial No. 626,388

4 Claims. (Cl. 307—106)

This invention relates to pulse-generating circuits of the all-magnetic modulator type.

The main object of the invention is to devise a circuit for developing square-wave pulses from a source of a different wave form, for example, from a source of alternating current of sine-wave form.

The invention employs saturable reactor elements for performing switching operations without the use of electron tubes for this purpose. Hence, the modulator circuit is of the "all-magnetic" type.

A more specific object of the invention is to devise a circuit for improving the wave form of the pulse, the object being to obtain a rectangular pulse having a flat top and a steep trailing edge. It is desirable that the pulse decrease rapidly from its maximum value to a very low value in a very short time. The pulse is to have a very short duration with reference to the period of the supply source.

The invention is illustrated in the accompanying drawing in which

Figures 1, 2:
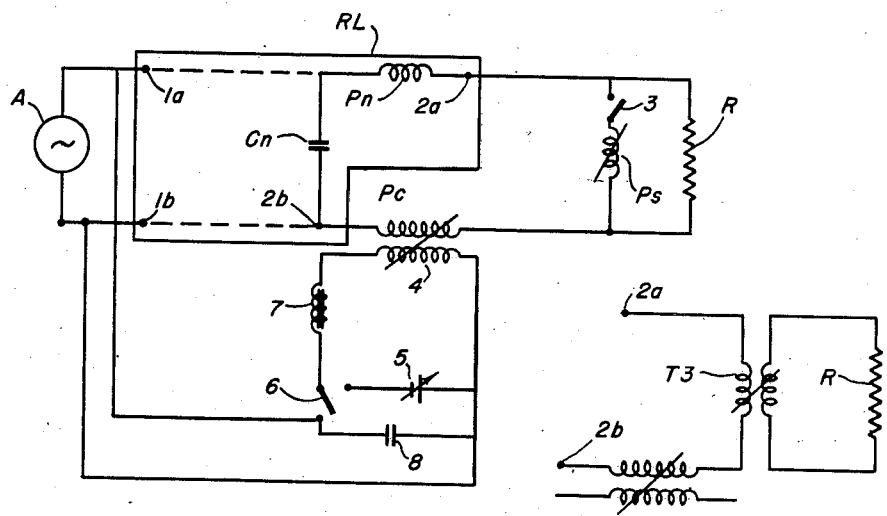
Figure 1 is a circuit diagram illustrating the principal components of the pulse-generating circuit.
Figures 2 and 3 show variations in the circuit of Figure 1.

Referring to Figure 1, A represents a suitable source of power, such as an alternator having a frequency equal to the desired pulse repetition rate. Generator A supplies sine-wave current to the input terminals of a resonant line RL formed of a number of resonant networks connected in cascade between input terminals $1a$, $1b$ and output terminals $2a$, $2b$. In the example shown in Figure 1, each network of line RL comprises a saturable magnetic reactor P (pulsactor) in series with the line and a shunt condenser C, only the last reactor $Pn$ and the last condenser $Cn$ being shown in the drawing. The positions of the two network reactance elements may be interchanged, that is, the reactors P may be shunt elements and the condensers C series elements, see Figure 3.

A suitable load R is connected across the resonant line output terminals $2a$, $2b$ in series with a saturable reactor $Pc$, which serves to clip and square the pulses supplied from the line to the load. A saturable reactor $Ps$ may be connected in shunt with the load R, by means of switch 3. This reactor could take the form of a transformer T3 having a saturable core as shown in Figure 2.

Clipping reactor $Pc$ is provided with a magnetizing winding 4 which may be energized from a source 5 of variable direct current through a switch 6 and a choke coil 7 presenting high impedance at the pulse repetition rate. Alternatively, winding 4 may be energized by alternating current from source A through a second position of switch 6, and a condenser 8 is provided to resonate with choke 7 at the frequency of source A. The bias current in winding 4 will be substantially in quadrature with the voltage applied to line RL by source A.

For unidirectional pulse operation (only one positive or negative output pulse for each cycle of source A), it is desirable to provide an adjustable bias on the saturable reactor of the first section of line RL. For biphase operation (two output pulses, alternately positive and negative, for each cycle of source A), it is not essential to bias any of the reactors in line RL.

The operation of Figure 1 will now be described, assuming reactor $Ps$ is connected across the load R and that the load mesh at the end of line RL is critically damped.

Figures 1A, 1B:
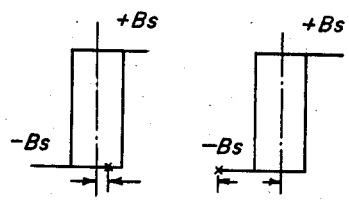
Figures 1a and 1b are saturation curves for explaining the operation of Figure 1.

All of the saturable reactors are provided with magnetic cores having rectangular B—H loops of the type shown in Figures 1a and 1b. Reactor $Pc$ is normally biased by winding 4 in a negative direction to a point $x$ beyond the negative saturation point, as shown in Figure 1b. During some initial portion of a positive alternation of the sine-wave voltage from generator A, reactors $Pn$, $Ps$ and $Pc$ are all saturated, that is, the magnetization of these reactors is along the negative branch of their respective B—H loops. Following this, condenser $Cn$ becomes charged. Simultaneously with this action, reactor $Pn$ unsaturates abruptly, and its flux builds up towards the positive saturated branch of the loop, see Figure 1a. Reactors $Ps$ and $Pc$ are so designed and adjusted as to remain saturated during this interval. In other words, $Pn$ is designed to saturate when the voltage across $Cn$ is at a maximum, and thereafter $Ps$ unsaturates abruptly, causing $Cn$ to discharge into the load R. $Pc$ remains saturated (that is, it remains on the negative branch of the loop) until the discharge current from $Cn$ (essentially the load current) becomes sufficiently large to equal the biasing force supplied by the winding 4. The discharge current remains fixed at this value, because $Pc$ unsaturates, its flux moving along the vertical portion of the loop. In the meantime, the flux in $Ps$ has been rising towards positive saturation, and, when $Ps$ becomes saturated, the load is effectively short-circuited, so that the load current drops rapidly towards zero. The general shape of the pulse appearing across the load R is illustrated in solid lines in Figure 4.

Figure 3:
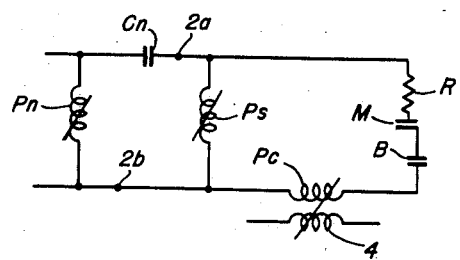

Figure 3 is a fragmentary circuit diagram showing a variation of the arrangement of Figure 1 for supplying flat-top pulses to a biased-diode load. In this arrangement, the resonant line is formed of shunt magnetic reactors and series condensers, and the shunt reactor $Ps$ is connected directly across the line output terminals $2a$, $2b$ instead of being connected directly across the load. Also, the load, a diode in series with a resistance R and biased from a source of biasing potential B, is connected in series with the clipper reactor $Pc$. The load might also be a magnetron. The remainder of the circuit of Figure 3 is in accordance with Figure 1, it being assumed that an alternating biasing current is applied to the winding 4 from source A through switch 6.

With the voltage applied to the biasing circuit being in phase with the voltage applied to the resonate line RL, the biasing current supplied to winding 4 is essentially in phase quadrature with the line voltage source and is approximately at its maximum value during the discharge of condenser $Cn$ into the load. The bias current through winding 4 varies slowly as compared with the load pulse and serves the same purpose as direct-current biasing.

Figure 4:
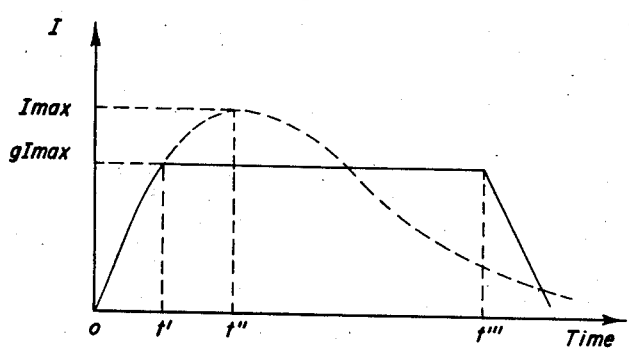
Figure 4 is a curve illustrating the shape of the output pulse appearing across the load element.

The operation of Figure 3 may be explained by reference to Figure 4 as follows:

The dotted line portion of the curve of Figure 4 illustrates a typical pulse shape which would flow through the load in the absence of any clipping action by the clipper reactor $Pc$. As shown, the pulse without clipping would rise to a maximum value $I_{max}$ at time $t''$ and then would slowly decay to zero along the dotted line portion of the curve. With the clipper reactor Pc in operation, the load current rises to a smaller value $gI_{max}$ at time $t'$ and then remains substantially constant over an interval of time (to the instant $t'''$) after which it decays suddenly to zero.

At the beginning of the main discharge of Cn to the load, the clipper reactor Pc is saturated, and its saturated inductance is small as compared with the saturated inductance of Pn. Consequently, the load current builds up initially as though the clipper reactor were short-circuited. When the load current reaches a value $gI_{max}$ such that its magnetizing effect in reactor Pc equals the effect of the biasing current in winding 4, the pulse-clipping reactor "absorbs" voltage. Furthermore, if the pulse-clipping reactor is ideal, i. e., possesses a step-shape B—H characteristic, and if the bias choke 7 is very large, then the load current is constant during the interval from $t'$ to $t'''$ for which Ps remains unsaturated. This is referred to as the "clipping interval." When Ps again saturates at the instant $t'''$, the load current decays rapidly toward zero.

The desired pulse wave-form is obtained by supplying a load with pulses from a resonant line of the magnetic modulator type, the line pulses being supplied to the load through a pulse-clipping reactor which is normally biased beyond one of its saturation points and the biasing circuit containing a choke inductance presenting a large impedance at the pulse frequency. At the beginning of an applied pulse, the load current builds up rapidly because the clipper reactor is saturated. When the load current reaches a certain value, the M. M. F. of the clipper reactor becomes zero. Following this, the reactor flux builds up and causes the load current to remain constant for a certain time and at a value determined by the amount of the bias. During the period of pulse-clipping, energy is stored in the choke inductance and is returned to the load circuit at a later time. By proper design of the reactor Pc and its biasing circuit the energy loss incidental to the pulse clipping and shaping operation can be reduced to a relatively small value.

We claim:
1. A pulse-generating circuit comprising a resonant transmission line formed of a plurality of networks connected in cascade, each network including a saturable-core reactor, a source of alternating current connected to the input of said line, a load connected to the output of said line in series with a saturable-core pulse-clipping reactor having a biasing winding, a circuit for energizing said biasing winding to normally bias said reactor at a point beyond one of the saturation points of the reactor, and a choke inductance connected in said energizing circuit in series with said biasing winding and having high impedance at the frequency of said source of alternating current.

2. A pulse-generating circuit according to claim 1 and including a saturable reactor connected directly across the output terminals of said line and operating to produce a rapid decay of the current in said load at the trailing edge of each pulse.

3. A pulse-generating circuit according to claim 1 and including a saturable reactor connected in shunt to the load and operating to produce a rapid decay of the current in said load at the trailing edge of each pulse.

4. A pulse-generating circuit comprising a resonant transmission line formed of a plurality of networks connected in cascade, each network including a saturable core reactor, a source of alternating current connected to the input of said line, a load connected to the output of said line in series with a saturable-core pulse-clipping reactor having a biasing winding, a circuit for energizing said biasing winding from said alternating current source with a current in phase quadrature to the voltage applied to the input of said line, and of a value normally to bias said pulse-clipping reactor at a point beyond one of its saturation points, a choke inductance connected in series in said energizing circuit and having high impedance at the frequency of said source, and a condenser connected across said energizing circuit of said winding and having a value to resonate with said choke inductance at the frequency of said alternating current source.

No references cited.